United States Patent
Heyse et al.

(10) Patent No.: US 8,931,333 B2
(45) Date of Patent: Jan. 13, 2015

(54) METHOD FOR DETERMINING HEADWIND VELOCITY

(71) Applicants: Joerg Heyse, Besigheim (DE); Udo Schulz, Vaihingen/Enz (DE); Andreas Wagner, Stuttgart (DE)

(72) Inventors: Joerg Heyse, Besigheim (DE); Udo Schulz, Vaihingen/Enz (DE); Andreas Wagner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 13/901,296

(22) Filed: May 23, 2013

(65) Prior Publication Data

US 2013/0319096 A1 Dec. 5, 2013

(30) Foreign Application Priority Data

May 30, 2012 (DE) .......................... 10 2012 209 050

(51) Int. Cl.
  *G01F 1/76* (2006.01)
  *G01P 5/10* (2006.01)
  *B60W 40/10* (2012.01)

(52) U.S. Cl.
  CPC ... *G01F 1/76* (2013.01); *G01P 5/10* (2013.01); *B60W 40/1005* (2013.01); *B60W 2510/0676* (2013.01)
  USPC ...................................... 73/114.68

(58) Field of Classification Search
  USPC ....................................... 73/114.68
  See application file for complete search history.

(56) References Cited

U.S. PATENT DOCUMENTS

| | | | |
|---|---|---|---|
| 6,584,789 B2 * | 7/2003 | Ishikawa | 62/171 |
| 6,615,647 B2 * | 9/2003 | Niki | 73/114.68 |
| 6,694,246 B2 * | 2/2004 | Masuda et al. | 701/114 |
| 6,804,588 B2 * | 10/2004 | Oki et al. | 701/33.6 |
| 6,857,398 B2 * | 2/2005 | Takagi et al. | 123/41.1 |
| 7,051,599 B2 * | 5/2006 | Foss | 73/861.85 |
| 7,325,447 B2 * | 2/2008 | Miyahara et al. | 73/114.68 |
| 2002/0184901 A1 * | 12/2002 | Ishikawa | 62/171 |
| 2003/0150406 A1 | 8/2003 | Takagi et al. | |
| 2006/0090573 A1 | 5/2006 | Foss | |

FOREIGN PATENT DOCUMENTS

| | | |
|---|---|---|
| DE | 102 41 228 | 3/2004 |
| DE | 60317125 | 7/2008 |

* cited by examiner

*Primary Examiner* — Freddie Kirkland, III
(74) *Attorney, Agent, or Firm* — Kenyon & Kenyon LLP

(57) ABSTRACT

A method for determining a velocity of headwind flowing in the direction of a vehicle, based on a coolant mass flow of a coolant flowing through a heat exchanger of a cooling device of the vehicle, and an air mass flow flowing through the heat exchanger and triggered by the headwind, includes: determining a temperature drop of the coolant mass flow; determining the air mass flow responsible for the temperature drop of the coolant mass flow; and determining the velocity of the headwind flowing in the direction of the vehicle, based on the air mass flow responsible for the temperature drop of the coolant mass flow.

10 Claims, 2 Drawing Sheets

METHOD FOR DETERMINING HEADWIND VELOCITY

BACKGROUND OF THE INVENTION

1. Field of the Invention

The present invention generally relates to a method for determining headwind velocities for vehicles, e.g., vehicles provided with cooling devices.

2. Description of the Related Art

A cooling device for cooling an internal combustion engine is known from published German patent document DE 102 41228 B4. In this cooling device, headwind intercepted while a vehicle is driven is routed through a heat exchanger through which a coolant that cools the coolant is circulating. The cooled coolant then is routed through a cylinder block of a combustion engine in order to cool it.

BRIEF SUMMARY OF THE INVENTION

According to the present invention, a method for determining a velocity of headwind flowing in the direction of a vehicle, based on a coolant mass flow of a coolant flowing through a heat exchanger of a vehicle's cooling device and an air mass flow flowing through the heat exchanger and triggered by the headwind is provided, as well as a device implementing the method and a vehicle having such a device.

According to one aspect of the present invention, a method for determining a velocity of headwind flowing in the direction of a vehicle, on the basis of a coolant mass flow of a coolant flowing through a heat exchanger of a vehicle's cooling device, and an air mass flow flowing through the heat exchanger and being triggered by the head wind, includes the steps of determining a temperature drop of the coolant mass flow; determining the air mass flow responsible for the temperature drop of the coolant mass flow; and determining the velocity of the headwind flowing around the vehicle on the basis of the air mass flow that is responsible for the temperature drop of the coolant mass flow.

The described method is based on the idea that the air resistance to a vehicle could be used as one of the running resistances counteracting the vehicle propulsion to infer the vehicle propulsion in order to derive a fuel consumption resulting from the vehicle propulsion. The present invention recognizes, however, that the difference between the vehicle velocity and the velocity of the headwind acting in opposition to the vehicle, which would actually have to be measured, is entered in the air resistance.

To measure the headwind velocity acting in opposition to the vehicle, a heat exchanger, cooled by the headwind, of a radiator of a combustion engine of the vehicle is used as sensor element in the present invention, since the velocity of the headwind is able to be determined directly from the cooling, caused by the headwind, of a coolant fluid flowing through the heat exchanger. This headwind velocity is directly the difference between the vehicle velocity and the velocity of the headwind acting in opposition to the vehicle that is required in order to determine the fuel consumption of a vehicle.

The advantage of the present invention therefore is that it provides a simple method for measuring the headwind velocity, which may be used to implement operating strategies and calculation methods for determining the fuel consumption in a more precise manner. No new sensor elements are required to implement the method, because the already installed radiator in a vehicle is able to be used as sensor element.

In one further refinement, the described methods includes the step of deactivating a suction device for aspirating the air mass flow in the cooling device when determining the temperature drop of the coolant mass flow. This step is based on the recognition that the suction device falsifies the headwind by its suction effect, because it accelerates the air flowing through the heat exchanger. In order to disregard this acceleration of the air, to be taken into account in addition, when determining the headwind velocity, the described method should be carried out when the suction device is deactivated.

In another further refinement of the described method, the method includes the step of determining a functional dependency between the headwind flowing in the direction of the vehicle and the air mass flow responsible for the temperature drop of the coolant mass flow, based on a test measurement. This step is based on the thought that the functional dependency between the headwind flowing in the direction of the vehicle and the air mass flow responsible for the temperature drop of the coolant mass flow is subject to a physical law that is able to be correlated by a test measurement. For example, this test measurement may be performed once in a wind tunnel, in order to then store the functional dependency in a memory and to call it up when determining the headwind velocity.

In one special further refinement, the test measurement is performed when an ambient wind velocity, which is composed of the difference between the velocity of the headwind and the velocity of the vehicle, is less than a predefined threshold value. This threshold value very preferably may be zero, thereby indicating that the velocity of the air around the vehicle, and thus the wind velocity around the vehicle, equals zero. Using the test measurement, the aforementioned functional dependency is able to be calibrated as the velocity of the vehicle based on the headwind flowing in the direction of the vehicle, since the functional dependency results directly from a comparison of the velocity of the vehicle and the air mass flow that is responsible for the temperature drop of the coolant mass flow.

It should be ensured for the test measurement that the wind velocity around the vehicle is indeed zero. The headwind velocity determined with the aid of the described method may be utilized as basis for this purpose, as long as it is deemed reliable; especially preferably, however, weather data may be considered in this context, which can be read out from a navigation device, for instance.

The test measurement of zero based on a wind velocity around the vehicle may be utilized for the first-time calibration of the functional dependency, but also for its correction.

In one additional further refinement, the described method includes the step of determining an air resistance acting in opposition to the vehicle, based on an ambient wind velocity of the wind around the vehicle, which is composed of the difference between the velocity of the headwind and the velocity of the vehicle.

In one preferred further refinement, the described method includes the step of entering the determined air resistance and/or the ambient wind velocity of the wind around the vehicle in a road map, based on the location at which the vehicle is presently located. The road map may be stored in a central memory, for example, to which a multitude of vehicles has access. In this way the air resistances measured by the described method, and/or the ambient wind velocities of winds around a vehicle may be used for creating detailed weather maps, whose air resistance data may be called up by other vehicles which then in turn may use these air resistance data to perform calculations for the fuel consumption, for instance when planning routes.

In one especially preferred further refinement, the described method includes the step of smoothing the velocity of the headwind flowing in the direction of the vehicle on the basis of a filter. This filter is able to perform the smoothing by forming a mean value, for example. The smoothing makes it possible to isolate from a locally calculated air resistance brief and locally occurring wind gusts that would falsify the measuring result.

In one alternative further refinement, the described method includes the step of discarding the velocity of the headwind flowing in the direction of the vehicle if a distance between the vehicle and a vehicle driving ahead of the vehicle drops below a predefined threshold distance. The distance is able to be detected by a distance sensor, for instance. By suppressing the headwind if another vehicle is situated at too close a distance in front of the vehicle, it is also possible to leave air resistances that do not correspond to the actual local conditions out of consideration.

According to another aspect, a device, in particular a computing unit, is provided to determine a velocity of the headwind flowing in the direction of a vehicle, based on a coolant mass flow of a coolant flowing through a heat exchanger of a cooling device of the vehicle, and an air mass flow flowing through the heat exchanger and triggered by the headwind, the device being developed to:

determine a temperature drop of the coolant mass air flow;

determine the air mass flow responsible for the temperature drop of the coolant mass flow; and determine the velocity of the headwind flowing in the direction of the vehicle, based on the air mass flow responsible for the temperature drop of the coolant mass flow.

In one further refinement of the present invention, the described device has a memory and a processor. The described method is stored in the memory in the form of a computer program, and the processor is provided to implement the method when the computer program is loaded from the memory into the processor.

According to another aspect of the present invention, a vehicle is equipped with a described device.

DETAILED DESCRIPTION OF THE INVENTION

Figure 1:
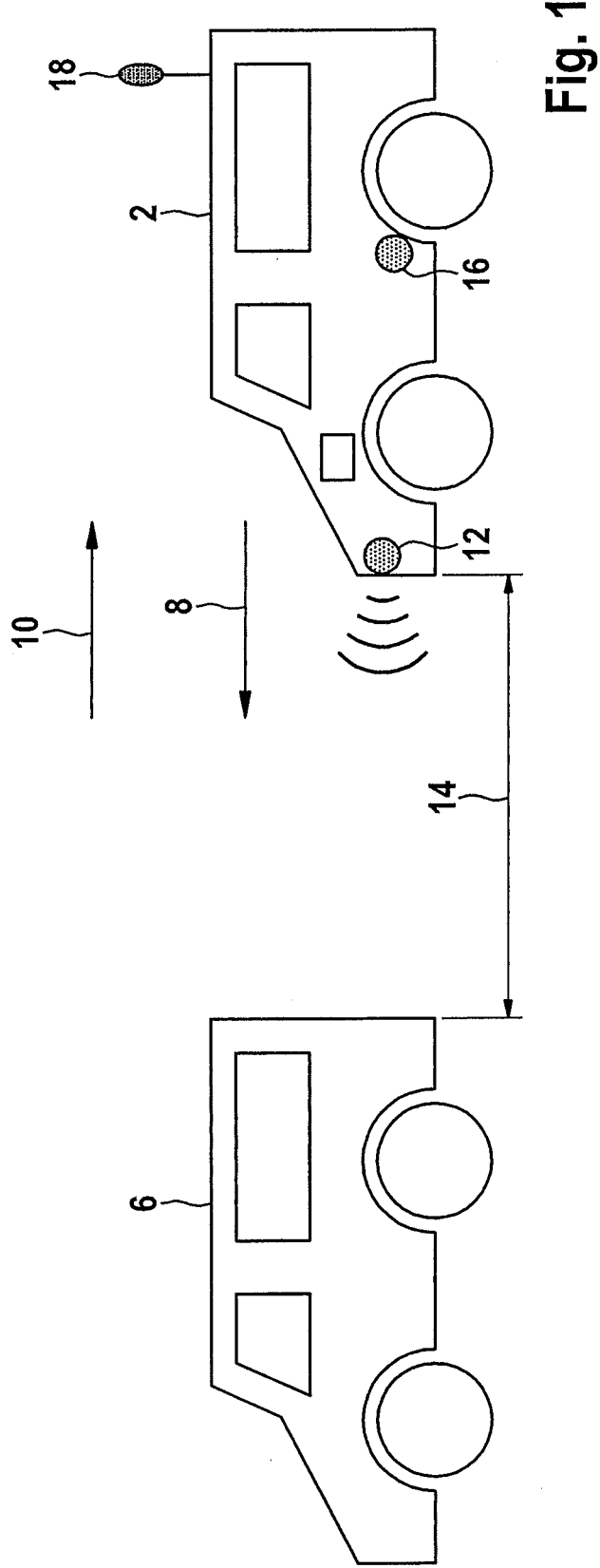
FIG. 1 shows a schematic view of a first vehicle having a device for calculating an air resistance, the vehicle driving behind a second vehicle.

Elements having the same or a comparable function have been provided with the same reference numerals in the figures and are described only once.

Reference is made to FIG. 1, which shows a schematic view of a first vehicle 2 having a device 4 for calculating an air resistance, the vehicle driving behind a second vehicle 6.

First vehicle 2 is driving behind second vehicle 6 at a speed 8, and headwind having a headwind velocity 10 is flowing in the direction of first vehicle 2.

In addition to device 4, first vehicle 2 includes a distance sensor 12, which may be used to determine a distance 14 between first vehicle 2 and second vehicle 6. In addition, first vehicle 2 has a speed sensor 16 for recording speed 8 of first vehicle 2, and an antenna 18 for a wireless data transmission.

Figure 2:
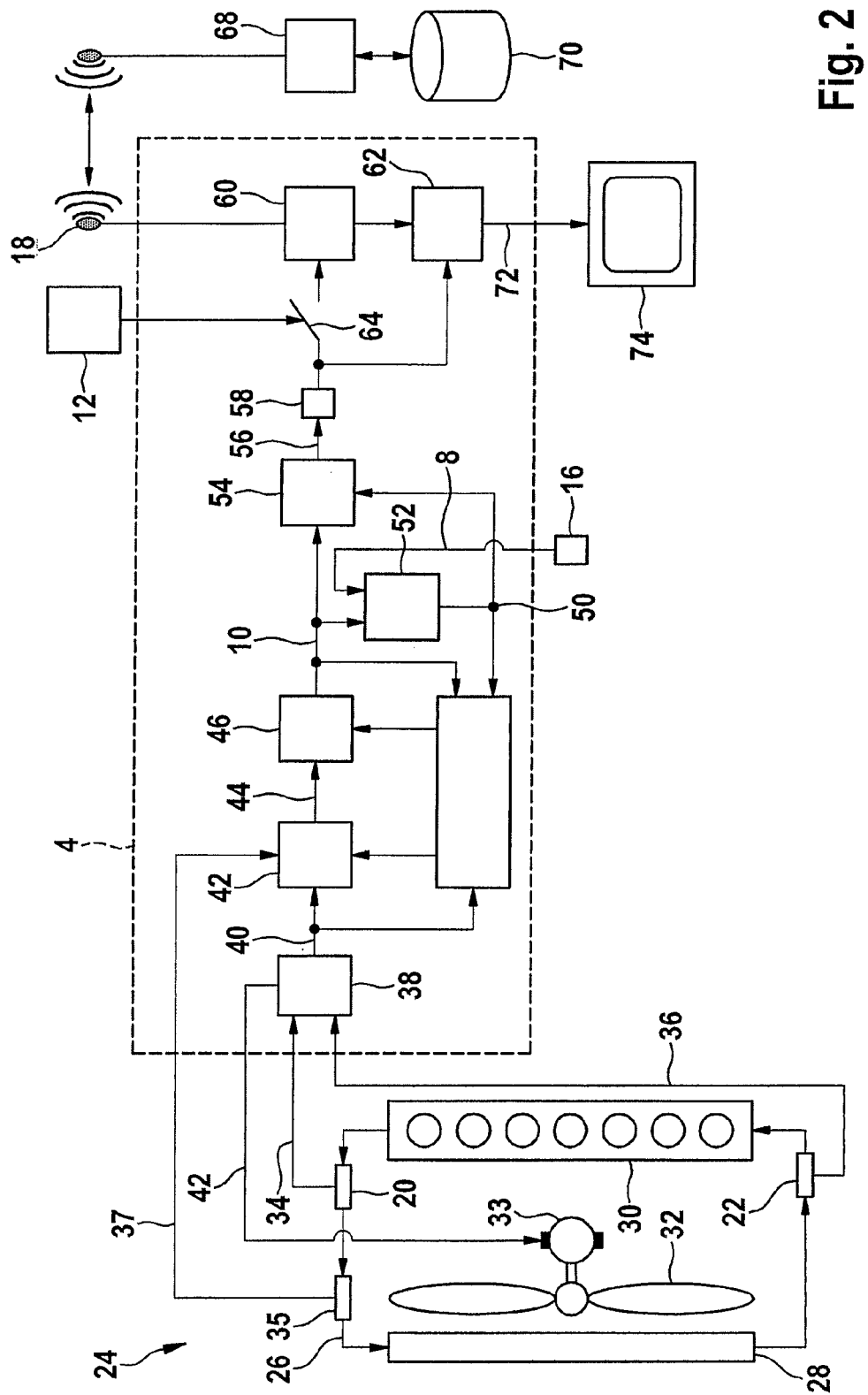
FIG. 2 shows a schematic view of a device from FIG. 1.

FIG. 2 shows a schematic view of a device 4 from FIG. 1. For the sake of clarity, device 4 is made up of many individual units in the present development, but it will usually be implemented in a single or multiple microcontroller(s) in terms of program technology.

Device 4 is connected to a first temperature sensor 20 and to a second temperature sensor 22, which detect the temperature of a coolant fluid 26 flowing as coolant inside a radiator 24. Coolant fluid 26 inside a heat exchanger 28 is cooled by air that is moved by the headwind, and flows through a combustion engine 30 of first vehicle 2 so as to cool it in a manner that is known per se. The air flow for cooling the coolant fluid is able to be increased by an aspiration device 32, which is driven via an electric motor 33.

Whereas first temperature sensor 20 is situated on heat exchanger 28 on the input side and thus detects temperature 34 of coolant fluid 26 into heat exchanger 28 on the input side, second temperature sensor 22 is situated on heat exchanger 28 on the output side and thus detects temperature 36 of coolant fluid 26 out of heat exchanger 28 on the output side.

In addition, a flow rate sensor 35 is situated in radiator 24, which determines the mass of coolant 26 flowing through flow-rate sensor 35 for a particular unit of time, and thereby determines mass flow 37 of coolant fluid 26. As an alternative, mass flow 37 of coolant fluid 26 could also be determined on the basis of a characteristic curve, which compares mass flow 37 of coolant fluid 26 to the power consumption of a coolant pump transporting coolant fluid 26. The power consumption of the coolant pump would need to be measured in such a case.

In a difference device 38, a temperature differential 40 is then determined from input-side temperature 34 and output-side temperature 36. With the aid of a switching signal 42, differential device 38 is able to switch off electric motor 33, and thus aspiration device 32, while temperature differential 40 is determined.

As already mentioned, air moved by headwind 10 is flowing through heat exchanger 28, which air cools coolant fluid 26 and therefore is responsible for temperature differential 40 in coolant fluid 26. The cooling process of coolant fluid 26 caused by the air, and the attendant heating of the air are subject to a physical law that depends on the angle at which the oncoming air and the coolant fluid move toward each other. The bases for determining this physical law are known to one skilled in the art and will not be discussed in greater detail at this point.

Based on the previously mentioned physical interrelationship of the manner in which the oncoming air cools coolant fluid 26, it is possible to calculate mass flow 44 of the air responsible for cooling coolant fluid 26 in a mass-flow calculation device 42 in connection with mass flow 37 of coolant fluid 26 supplied by flow-rate sensor 35.

If mass flow 44 of the air is known, the velocity of the oncoming air, and thus headwind velocity 10, is able to be calculated in a velocity calculation device 46, based on the known density of the air and the known geometrical dimensions of heat exchanger 28.

The physical interrelationship in mass-flow calculation device 42 and also in velocity calculation device 46 is described by a functional relationship in each case. Both calculation devices 42, 46 are also implementable jointly in a single calculation device, without calculating mass flow 44 of the air as intermediate result. The functional relationship stored in calculation devices 42, 46 is able to be specified or corrected, i.e., calibrated, by a programming device 48, for instance.

For the calibration, programming device 48 needs the calibration signals, assumed to be known, from which the functional relationship to be stipulated is able to be determined. For example, a signal assumed to be known would be headwind velocity 10 when ambient wind velocity 50 is equal to zero in the environment of first vehicle 2. In such a case, vehicle velocity 10 is equal to velocity 8 of first vehicle 2 in quantitative terms.

To determine ambient wind velocity 50, velocity 8 of first vehicle 2 is measured by velocity sensor 16 and forwarded to another difference device 52. Ambient wind velocity 50 is determined in further difference device 52, from a vectorial addition of vehicle velocity 8 and headwind velocity 10 or its difference in absolute value.

Programming device 48 receives ambient wind velocity 50 and, based on vehicle velocity 8, determines whether ambient wind velocity 50 is equal to zero. If this is true, it uses temperature difference 40 and headwind velocity 10 as the basis for determining the aforementioned functional relationship and utilizes this relationship to program both calculation devices 42, 46, because headwind velocity 10 corresponds precisely to known vehicle velocity 8 in this case.

Air resistance 56, which the second vehicle must overcome by its vehicle propulsion, is able to be calculated in an air-resistance calculation device 54, based on calculated ambient wind velocity 50 and headwind velocity 10. This air resistance 56 may be smoothed in a filter 58, for instance by forming a temporal mean value, and forwarded to a transmission device 60 and/or to a fuel-consumption calculation device 62.

Preferably, a distance sensor 12 interrupts the forwarding of air resistance 56 to transmission device 60 by a switch 64 if distance 14 of first vehicle 2 in relation to second vehicle 6 is too low and headwind velocity 10 is influenced too much by second vehicle 6.

Transmission device 60 links air resistance 56 to a current position of first vehicle 2 and transmits air resistance/position pair 66 via antenna 18 to a server 68, which stores air resistance/position pair 66 in a database 70 and makes it available to other vehicles for route planning if required. Navigation maps, which indicate the local air resistance conditions and from which the most economical routes in terms of fuel consumption may be calculated between a desired starting point and a destination, are able to be created in this manner.

Fuel-consumption calculation device 62 may use the air resistance to determine the actual fuel consumption and to determine expected range 72 of an actual fuel-tank content in the first vehicle. These calculations would be independent of distance 14 between second vehicle 6 and first vehicle 2, since the headwind, affected by second vehicle 6, has an effect on the fuel consumption of first vehicle 2 as well.

Calculated expected range 72 of the fuel-tank content may be displayed on a monitor 74 in vehicle 2, for example, so that the driver will be informed accordingly.

What is claimed is:

1. A method for determining a velocity of a headwind flowing in the direction of a vehicle, based on (i) a coolant mass flow of a coolant flowing through a heat exchanger of a cooling device of the vehicle, and (ii) an air mass flow flowing through the heat exchanger and triggered by the headwind, the method comprising:
   determining a temperature drop of the coolant mass flow;
   determining the air mass flow responsible for the temperature drop of the coolant mass flow; and
   determining the velocity of the headwind flowing in the direction of the vehicle, based on the air mass flow responsible for the temperature drop of the coolant mass flow.

2. The method as recited in claim 1, further comprising:
   deactivating, when the temperature drop of the coolant mass flow is determined, an aspiration device for aspirating the air mass flow in the cooling device.

3. The method as recited in claim 2, further comprising:
   determining a functional relationship between (i) the velocity of the headwind flowing in the direction of the vehicle, and (ii) the air mass flow responsible for the temperature drop of the coolant mass flow.

4. The method as recited in claim 3, wherein a test measurement to determine the functional relationship is performed when an ambient wind velocity, defined as the difference between the velocity of the headwind and the velocity of the vehicle, is less than a predefined threshold value.

5. The method as recited in claim 3, further comprising:
   determining an air resistance acting in opposition to the vehicle, based on an ambient wind velocity, defined as the difference between the velocity of the headwind and the velocity of the vehicle.

6. The method as recited in claim 5, further comprising:
   entering at least one of the determined air resistance and the ambient wind velocity in a database, based on a current location of the vehicle.

7. The method as recited in claim 5, further comprising:
   smoothing, using a filter, at least one of the velocity of the headwind flowing in the direction of the vehicle and the determined air resistance.

8. The method as recited in claim 5, further comprising:
   discarding the velocity of the headwind flowing in the direction of the vehicle if a distance between the vehicle and a second vehicle ahead of the vehicle drops below a predefined threshold distance.

9. A device for determining a velocity of a headwind flowing in the direction of a vehicle, based on (i) a coolant mass flow of a coolant flowing through a heat exchanger of a cooling device of the vehicle, and (ii) an air mass flow flowing through the heat exchanger and triggered by the headwind, the device comprising:
   means for determining a temperature drop of the coolant mass flow;
   means for determining the air mass flow responsible for the temperature drop of the coolant mass flow; and
   means for determining the velocity of the headwind flowing in the direction of the vehicle, based on the air mass flow responsible for the temperature drop of the coolant mass flow.

10. A non-transitory computer-readable data storage medium storing a computer program having program codes which, when executed on a computer, perform a method for determining a velocity of a headwind flowing in the direction of a vehicle, based on (i) a coolant mass flow of a coolant flowing through a heat exchanger of a cooling device of the vehicle, and (ii) an air mass flow flowing through the heat exchanger and triggered by the headwind, the method comprising:
   determining a temperature drop of the coolant mass flow;
   determining the air mass flow responsible for the temperature drop of the coolant mass flow; and
   determining the velocity of the headwind flowing in the direction of the vehicle, based on the air mass flow responsible for the temperature drop of the coolant mass flow.

* * * * *